United States Patent
Baisnee

(10) Patent No.: US 11,403,633 B2
(45) Date of Patent: Aug. 2, 2022

(54) METHOD FOR SENDING DIGITAL INFORMATION

(71) Applicant: TAKLANE, Coutances (FR)

(72) Inventor: Pascal Baisnee, Coutances (FR)

(73) Assignee: TAKELANE, Anneville-sur-Mer (FR)

( * ) Notice: Subject to any disclaimer, the term of this patent is extended or adjusted under 35 U.S.C. 154(b) by 328 days.

(21) Appl. No.: 16/061,996

(22) PCT Filed: Dec. 14, 2016

(86) PCT No.: PCT/FR2016/053421
§ 371 (c)(1),
(2) Date: Jun. 13, 2018

(87) PCT Pub. No.: WO2017/103472
PCT Pub. Date: Jun. 22, 2017

(65) Prior Publication Data
US 2018/0374093 A1   Dec. 27, 2018

(30) Foreign Application Priority Data

Dec. 15, 2015  (FR) .................................. 1562430

(51) Int. Cl.
*G06Q 20/40* (2012.01)
*H04L 9/40* (2022.01)
(Continued)

(52) U.S. Cl.
CPC .......... *G06Q 20/40* (2013.01); *G06Q 20/322* (2013.01); *G06Q 20/382* (2013.01);
(Continued)

(58) Field of Classification Search
CPC .. G06Q 20/322; G06Q 20/382; G06Q 20/425; G06Q 20/40; H04L 9/3297; H04L 67/141
(Continued)

(56) References Cited

U.S. PATENT DOCUMENTS

2011/0219427 A1*  9/2011  Hito et al.
2013/0282582 A1*  10/2013  Pereira et al.
(Continued)

FOREIGN PATENT DOCUMENTS

EP    1103935 A2    5/2001

OTHER PUBLICATIONS

International Search Report for International Application No. PCT. FR2016/053421 dated Feb. 17, 2017, 2 pages.
(Continued)

*Primary Examiner* — James D Nigh
*Assistant Examiner* — Yin Y Choi
(74) *Attorney, Agent, or Firm* — TraskBritt

(57) ABSTRACT

The disclosure relates to a method for sending digital information from a computer server SMa to a first connected device EAU1. The method including initial steps for registering a server SMA. Steps for validating information provided on the first connected device EAU1 include: an operation in which a communication session that is secured by the first computer server SMa is opened with the trusted server and a time-stamped code CXa is confidence-scored; an operation in which the server SMa sends a piece of digital information with a built-in representation of the time-stamped code CXa; an operation in which a communication session with the trusted server is opened by the second connected device EBU1 by means of the pre-loaded application and the acquired code CY is sent; an operation of verifying that the code CY is consistent with the code CXa; and an operation in which the trusted server sends, to the second connected device EBU1, a digital validation message MVa including an indicator that the code CY is consistent with the code CX and a piece of information Iva related to the server SMa associated with the code CXa.

4 Claims, 1 Drawing Sheet

(51) Int. Cl.
*G06Q 20/32* (2012.01)
*G06Q 20/38* (2012.01)
*G06Q 20/42* (2012.01)
*H04L 9/32* (2006.01)
*H04L 67/141* (2022.01)
*H04W 12/77* (2021.01)

(52) U.S. Cl.
CPC ......... *G06Q 20/425* (2013.01); *H04L 9/3297* (2013.01); *H04L 63/0853* (2013.01); *H04L 63/1483* (2013.01); *H04L 63/18* (2013.01); *H04L 67/141* (2013.01); *H04W 12/77* (2021.01)

(58) Field of Classification Search
USPC .......................................................... 705/64
See application file for complete search history.

(56) References Cited

U.S. PATENT DOCUMENTS

2015/0095219 A1* 4/2015 Hurley
2016/0314462 A1* 10/2016 Hong et al.

OTHER PUBLICATIONS

International Written Opinion for International Application No. PCT.FR2016/053421 dated Feb. 17, 2017, 7 pages.
European Communication pursuant to Article 94(3) EPC for European Application No. 16826097, dated Oct. 15, 2020, 4 pages.

* cited by examiner

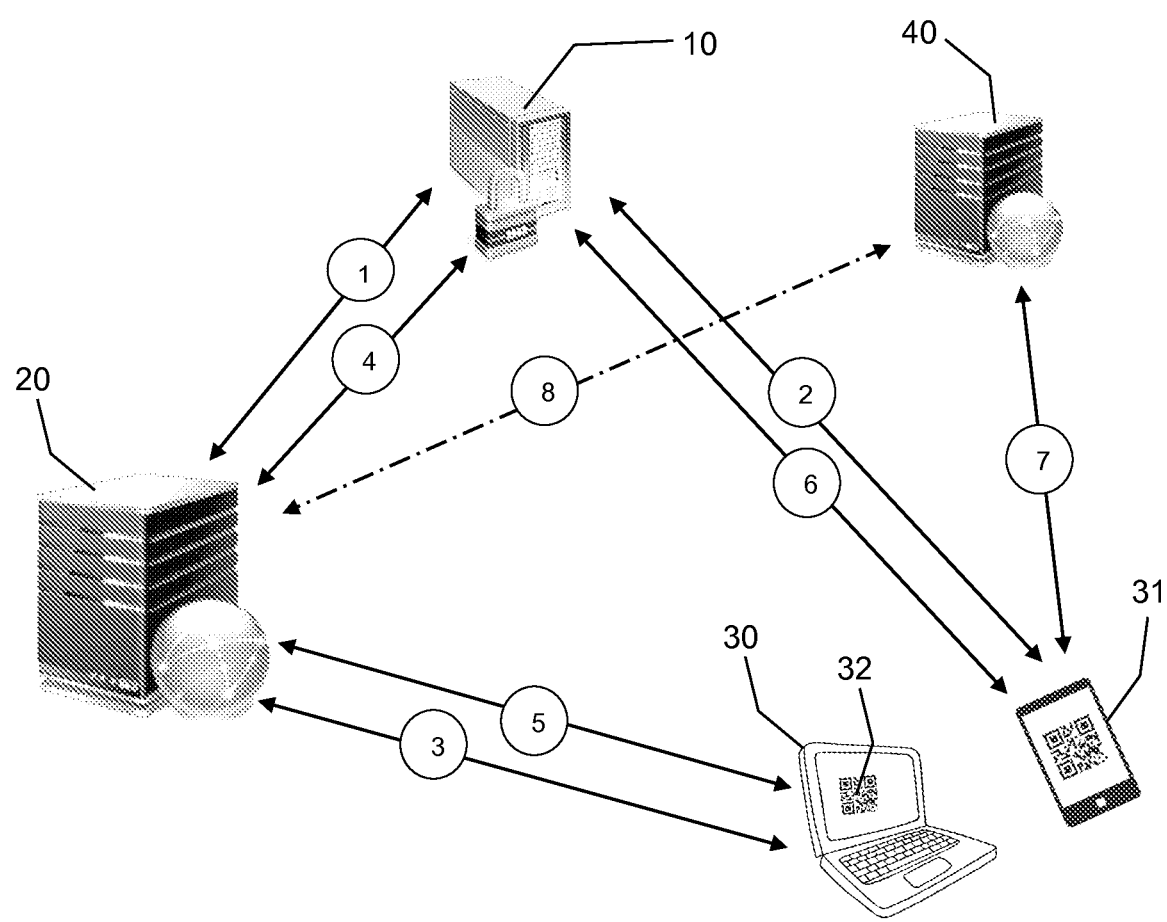

METHOD FOR SENDING DIGITAL INFORMATION

CROSS-REFERENCE TO RELATED APPLICATIONS

This application is a national phase entry under 35 U.S.C. § 371 of International Patent Application PCT/FR2016/053421, filed Dec. 14, 2016, designating the United States of America and published as International Patent Publication WO 2017/103472 A1 on Jun. 22, 2017, which claims the benefit under Article 8 of the Patent Cooperation Treaty to French Patent Application Serial No. 1562430, filed Dec. 15, 2015.

TECHNICAL FIELD

The present application relates to the field of on-line services accessible through the internet.

BACKGROUND

Access to remote sites or services is achieved by establishing a communication session between connected equipment, for example, a computer, a tablet or a mobile telephone, and a server where the user knows its address and enters it in a browser, or to which the user gains access via a search engine or by a link transmitted by an electronic message or appearing on the page of another site.

From the page displayed, the user next carries out transactions, which may relate to sensitive questions, such as the supply of confidential information, undertakings or on-line payment.

The development of these transactional means has unfortunately given rise to the proliferation of frauds. One widespread fraud is known as phishing. This form of computer piracy is used by fraudsters in order to attempt to recover information (generally banking information) from internet users, by exploitation by duping the internet users by means of an e-mail appearing to come from a trusted company, typically a bank or a commercial site.

The e-mail sent by these pirates usurps the identity of a company bank, e-commerce site, etc., and invites them to connect on line by means of a hypertext link and to update information relating to them in a form on a fictitious web page, a copy in conformity with the original site, on the pretext, for example, of updating the user's personal information on their service, as an action by technical support, etc.

Thus, by means of the form, the pirates succeed in obtaining the identifiers and passwords of the Internet users or personal or banking data (a customer number, a bank account number, etc.).

By means of these data, the pirates are capable of directly transferring money into another account or of subsequently obtaining the necessary data by intelligently using the personal data thus collected.

PRIOR ART

In order to counter this type of fraud, various solutions are known in the prior art.

Some browser software include protection devices: a central server every day registers new phishing sites and communicates this list to browsers installed on the computers of the internet users, which are then in a position to alert any users who happen to connect to these fraudulent sites.

When the protection function is activated, the browser downloads a list of the sites identified as hosting phishing scripts and compares it continuously with the sites on which the internet user is surfing. This enables a server associated with a browser to know the new sites in real time and to initiate very effective alerts. The list is updated automatically without action by the user. However, as sites appear in a few minutes, this device is supplemented by a system for express verification by the user himself, who checks whether or not a suspect site forms part of the list that has been downloaded.

Some browser toolbars include protection against phishing by sending to a central server a list of all the sites visited and comparing them with the phishing sites.

The solution described in European Patent EP 1103935 is also known, proposing the combined use of at least two communication networks and more precisely the exchange of information confidential to a user of a first information carrier by means of a second information carrier via a mechanism for synchronization of the information carriers and sending information from one carrier to the other. The method for sending information on a first carrier thus comprises: a system of opening a communication session with a communication means situated at a distance, on the first communication carrier and, during the session: an operation of receiving confidential information on a terminal with a unique address on a second communication carrier, and an operation of sending, on the first communication carrier, a confidential message representing the confidential information, an operation for checking whether the confidential message corresponds to the confidential information.

DRAWBACKS OF THE PRIOR ART

The solutions based on the consultation of a list of phishing sites are not completely effective since the solutions do not take into account the most recent sites that have not yet been identified and recorded in the base, and cyber fraudsters have developed strategies of very rapid changes of addresses of the phishing sites.

The solution proposed by European Patent EP 1103935 is also not satisfactory since it is tedious to use and verification is subsequent to the transmission of sensitive information.

BRIEF SUMMARY

In order to remedy these drawbacks, this application discloses, in its most general acceptance, a method for transmitting digital information from a (merchant) computer server SMa to a first (user U1) connected terminal EAU1, wherein the method comprises:
  initial steps comprising:
    the recording of an identifier of the computer server SMa unique to the computer server;
    recording, on a second connected terminal EBU1 of the same user U1, of an application demanding the automatic opening of a computer session with the trusted server when a code presented on the connected terminal EAU1 is read;
  steps of validating information presented on the first connected terminal EAU1, comprising:
    an operation of opening a communication session by the first connected terminal EAU1 with a computer server SMa;
    an operation of opening a secure communication session by the first computer server SMa with the trusted server, and of calculation by the trusted server of a time-stamped code CXa associated with the key;

an operation of transmission by the server SMa of digital information including a representation of the time-stamped code CXa;

an operation of acquisition of the time-stamped code CY presented by the first connected terminal EAU1 by the second connected terminal EBU1;

an operation of opening a communication session by the second connected terminal EBU1 with the trusted server by means of the previously loaded application and of transmission of the acquired code CY;

an operation of checking the conformity of the code CY with the code CXa;

an operation of transmission to the second connected terminal EBU1 by the trusted server of a digital validation message MVa comprising an indicator of conformity of the code CY with the code CX and information Iva relating to the server SMa associated with the code CXa.

According to a variant, the digital validation message MVa further comprises a link for opening a secure session to a server, the address of which is calculated by the trusted server according to the recorded information associated with the server SMa.

According to a particular embodiment, the server, the address of which is calculated by the trusted server according to the recorded information associated with the server SMa, is a (payment) server SMp distinct from the server SMa.

For the present disclosure, "equipment" means a connected hardware device such as a tablet or a mobile telephone executing software applications as well as non-physical forms in the form of software applications.

For the operation of acquisition of the code, it can be performed from two distinct terminals or from two software applications executed on the same terminal.

BRIEF DESCRIPTION OF THE DRAWING

The present disclosure will be better understood from a reading of the following description, relating to a non-limitative example embodiment, wherein:

FIG. 1 shows a schematic view of a system for implementing the disclosed method.

DETAILED DESCRIPTION

The system uses a trusted server 10 comprising a memory for recording verified transaction servers 20.

The recording step 1 is performed by the opening of a session between a merchant server 20 and the trusted server 10 allocating a session identifier to the merchant server 20 and recording of the information relating to the site, the security of which is expected. This information contains, in particular, an identifier of the site, for example, the root URL address, the MAC (media access control) physical address, the IP address and/or any other information for identification of the site.

Prior to the recording, a check on the authenticity of this information is made in a known manner. The trusted server 10 next calculates a unique key or a unique encryption key, associated with the identifier of the validated site. This key is recorded on the merchant server 20.

A user wishing to check the authenticity of the site, downloads into the memory of a connected terminal 31 by means of an operation 2, a software application from the trusted server 10, optionally by means of an application server. During this operation, the trusted server 10 can optionally provide an exchange of messages for recording information specific to the user, and can transmit a session identifier or a cookie that will be recorded on the connected terminal 31 of the user.

When the user connects to a site with connected equipment 30, for example, by means of a search engine or the entry of the address in the bar of the browser or by activating a hypertext link, the user opens a session 3 in the normal way with the server 20 hosting the site corresponding to the address in question.

If it is a site previously recorded on the trusted server, the server 20 opens a session 4 via the key that was allocated to it by the trusted server 10 at the time of the initial registration.

The trusted server 10 then calculates the time-stamped random digital code, which is transmitted to the server 20 and is then integrated in the page of the site corresponding to the address in question. This code may take the form of a matrix code of the QR code type. The HTML file corresponding to the page integrating this code is transmitted by a step 5 to the connected equipment 30, which demands the display of the page integrating the code 32 displayed in a graphic form.

This graphic code 32 is flashed by means of connected terminal 31, distinct from the connected equipment 30 that established the session with the server 20.

The acquisition of the code 32 by the activation of the application previously installed on the connected terminal 31, opens a session 6 with the trusted server 10 and the transmission by the connected terminal 31 of the flashed code. The trusted server 10 compares the transmitted code with the codes generated during the validity time slot and, in the event of success, transmits to the connected terminal 31 a digital message comprising a conformity indicator, for example, a code commands a colored area in a first color, as well as information recorded in relation to the identifier of the site associated with the code 32.

The user can thus obtain confirmation that the consulted site is authentic.

In the case of a fraudulent site, any code simulated by the fraudster will be acquired by the connected terminal 31 and transmitted to the server, and will lead to unsuccessful verification processing, which will trigger the sending of a digital alert message.

The digital message sent in the event of conformity may also contain a hypertext link, the activation of which demands the opening of a session 7 with a third-party server 40, for example, a payment server, for performing a secure transaction 8.

Unlike a data base or a file system, the system keeps the information for a few minutes. This duration depends on the configuration of the server but is generally fixed at 24 minutes by default. The server creates files stored in a particular directory.

The sessions are particularly used for this type of application:

The member spaces and accesses protected with authentication.

Management of a caddie on an on-line sales site.

Forms exploded over a plurality of pages.

Storage of information relating to the browsing of the user (preferred theme, languages, etc.).

The principle of the disclosure is to separate the validation of a site, a product on a site and the payment page.

For this purpose, it creates a concatenation at a minimum of two digital codes, which makes it possible to certify with the applicant that the code has a direction and a precise property, the information of which it can check.

This solution eliminates the "middle man attack" effect by creating a break in the web communication logic. The middle man attack (MMA), or man in the middle attack (MITM), is an attack, the purpose of which is to intercept the communications between two parties, without either one being able to detect that the communication channel between them has been compromised. The most usual channel is an internet connection of the internet user. First of all, the attacker must be capable of observing and intercepting the messages from one victim to the other. The "middle man" attack is particularly applicable in the Diffie-Hellman key exchange method when it is used without authentication. With authentication, Diffie-Hellman is, on the other hand, invulnerable to listening in on the channel, and is moreover designed for this purpose.

The solution according to the disclosure provides for the downloading of an application from a secure trusted downloading platform on connected equipment, for example, a tablet or a mobile telephone.

This application, once loaded, gives it the possibility of scanning the codes, which are activated at its request for certifying.

The unique codes created by the trusted server at each application of the web server return to the site so that the unique codes are displayed.

For the applicant, it suffices for him to scan the code with the connected equipment loaded with the downloaded application.

The scanned information is directed to the trusted server, which first certifies the code and takes into account the information that it has in its database.

It returns to the applicant a certificate associated with various types of information, the details of the belonging of the code (URL of the site, product, validation of the mark and of the site (trust code), and payment urn).

The invention claimed is:
1. A method for transmitting digital information from a computer server SMa (merchant) to a first connected terminal EAU1 (user U1), wherein the method comprises:
   performing initial steps comprising: recording an identifier relating to sites, the security of which is expected, of the computer server SMa unique to the computer server SMa;
   calculating and generating, at a trusted server, a key associated with the identifier;
   recording, on the computer server SMa, the key;
   recording, on a second connected terminal EBU1 of the same user U1, of an application demanding an automatic opening of a computer session with the trusted server when a code presented on the first connected terminal EAU1 is read; and
   performing steps of validating information presented on the first connected terminal EAU1, comprising: opening a first communication session by the first connected terminal EAU1 with the computer server SMa;
   opening a secure communication session by the computer server SMa with the trusted server via the key that was allocated to computer server SMA by the trusted server, and
   calculating a time-stamped random digital code CXa associated with the key by the trusted server, the time-stamped random digital code CXa being transmitted to the computer server SMa, and being integrated in a page of the site;
   transmitting, via the computer server SMa, the page integrating the time-stamped random digital code CXa to the first connected terminal EAU1;
   acquiring by the second connected terminal EBU1, of the time-stamped random digital code CXa presented by the first connected terminal EAU1;
   displaying the time-stamped random digital code CXa on the first connected terminal EAU1;
   opening a second communication session, via the second connected terminal EBU1, with the trusted server by means of the previously loaded application and transmitting the acquired the time-stamped random digital code CXa back to the trusted server;
   comparing the random digital code CXa transmitted back to the trusted server in the last step with the random digital code CXa calculated by the trusted server; and
   transmitting to the second connected terminal EBU1 via the trusted server a digital validation message MVa comprising an indicator of conformity of the time-stamped random digital code CXa transmitted back to the trusted server with the time-stamped random digital code CXa calculated by the trusted server, and information relating to the computer server SMa associated with the time-stamped random digital code CXa.

2. A method for transmitting digital information from the computer server SMa (merchant) to a first connected terminal EAU1 according to claim 1, wherein the digital validation message MVa further comprises a link for opening a secure session to a third-party server, the address of which is calculated by the trusted server according to the recorded identifier associated with the computer server SMa.

3. A method for transmitting digital information from the computer server SMa (merchant) to a first connected terminal EAU1 according to claim 2, wherein the address of the third-party server is calculated by the trusted server according to recorded information associated with the computer server SMa, is a payment server SMp distinct from the computer server SMa.

4. A method for transmitting digital information from a computer server SMA (merchant) to a first connected terminal EAU1 of a user (U1), the method comprising: performing initial steps comprising:
   a first step of validating a site by checking on an authenticity of information relative to an identification of the site;
   a second step of recording an identifier with information relative to the identification of the site;
   a third step of calculating, via a trusted server, a unique key associated with the identifier of the validated site and recording the key on the computer server SMA (merchant);
   for the user (U1) wishing to check the authenticity of the site, a 4th step of recording, on a second connected terminal EBU1 of the same user (U1), of an application demanding an automatic opening of a computer session with the trusted server;
   when a code presented on the first connected terminal EAU1 is read; and
   performing steps of validating information relative to the identification of the site presented on the first connected terminal EAU1, comprising:
   a fifth step of opening a first communication session by the first connected terminal EAU1 with the computer server SMA (merchant), when the user (U1) connects to a site to be verified or validated;

a sixth step of opening a secure communication session by the computer server SMA (merchant) with the trusted server via the key that was allocated to the computer server SMA (merchant) by the trusted server, if the site to be verified has been validated and recorded on the trusted server;

a seventh step of calculating by the trusted server a time-stamped random digital code CXa, which is transmitted to the computer server SMA (merchant), and which is integrated in a page of the site;

a eighth step of transmitting, via the computer server SMA (merchant), the page integrating the time-stamped random digital code CXa to the first connected terminal EAU1;

a ninth step of displaying the page integrating the time-stamped random digital code CXa on the first connected terminal EAU1;

a tenth step of acquiring by the second connected terminal EBU1 the time-stamped random digital code CXa presented by the first connected terminal EAU1;

an eleventh step of opening a second communication session via the second connected terminal EBU1, with the trusted server by means of the previously loaded application and transmitting the acquired time-stamped random digital code CXa back to the trusted server;

a twelfth step of comparing by the trusted server the transmitted code CXa in the eleventh step with the calculated time-stamped random digital code CXa in the seventh step;

a thirteenth step of transmitting to the second connected terminal EBU1 via the trusted server: a digital validation message MVa comprising an indicator of conformity of the transmitted time-stamped random digital code CXa in the eleventh step with the calculated time-stamped random digital code CXa in the seventh step, and information recorded in relation to the identifier of the site associated with the time-stamped random digital code CXa.

\* \* \* \* \*

UNITED STATES PATENT AND TRADEMARK OFFICE
CERTIFICATE OF CORRECTION

| | |
|---|---|
| PATENT NO. | : 11,403,633 B2 |
| APPLICATION NO. | : 16/061996 |
| DATED | : August 2, 2022 |
| INVENTOR(S) | : Pascal Baisnee |

It is certified that error appears in the above-identified patent and that said Letters Patent is hereby corrected as shown below:

On the Title Page
- In Item (73), Line 1, change "TAKELANE" to --TAKLANE--
- In Item (57), Line 4, change "a computer" to --a [merchant] computer--
- In Item (57), Line 5, change "device" to --[user U1] device--

In the Claims
- Claim 1, Column 6, Line 7, change "EBU1, of the" to --EBU1, the--
- Claim 1, Column 6, Line 16, change "acquired the time-stamped" to --acquired time-stamped--

Signed and Sealed this
Twenty-first Day of March, 2023

Katherine Kelly Vidal
*Director of the United States Patent and Trademark Office*